United States Patent [19]

Eberhardt

[11] Patent Number: 4,633,895

[45] Date of Patent: Jan. 6, 1987

[54] FLUID PROPORTIONING APPARATUS

[75] Inventor: H. Alfred Eberhardt, Paoli, Pa.

[73] Assignee: Hale Fire Pump Company, Conshohocken, Pa.

[21] Appl. No.: 814,742

[22] Filed: Dec. 30, 1985

[51] Int. Cl.[4] .............................................. F16K 19/00

[52] U.S. Cl. ...................................................... 137/98

[58] Field of Search ...................... 137/98, 99; 169/14, 169/15

[56] References Cited

U.S. PATENT DOCUMENTS 3,380,467 4/1968 Diehl .................................... 137/99

3,647,002 3/1972 Knowles ........................... 137/98 X 4,064,891 12/1977 Eberhardt ............................ 137/98

*Primary Examiner*—Robert G. Nilson

*Attorney, Agent, or Firm*—Frank A. Follmer

[57] ABSTRACT

Apparatus is described for admixing a foam-liquid solution with water in a predetermined proportion for use in a foam-water fire fighting system. The arrangement is such that the water supply line of the apparatus takes water out of the fire main and uses this water pressure to work a piston to develop pressure of the foam liquid so as to boost up this foam liquid pressure to a pressure that slightly exceeds the water pressure in the fire main.

18 Claims, 11 Drawing Figures

FIG. 4
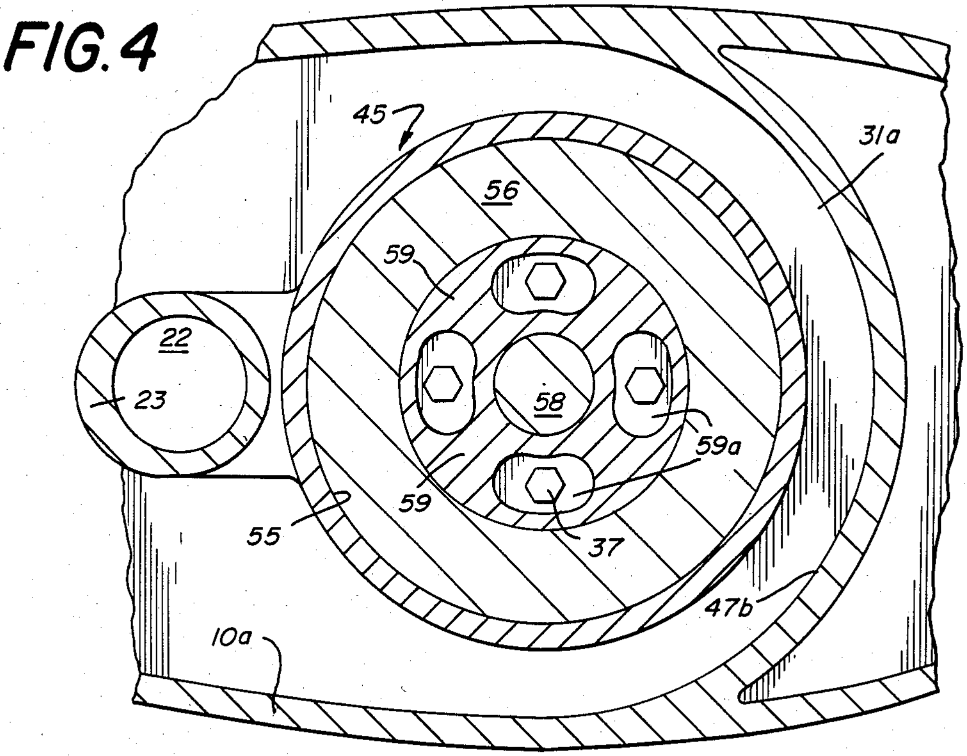
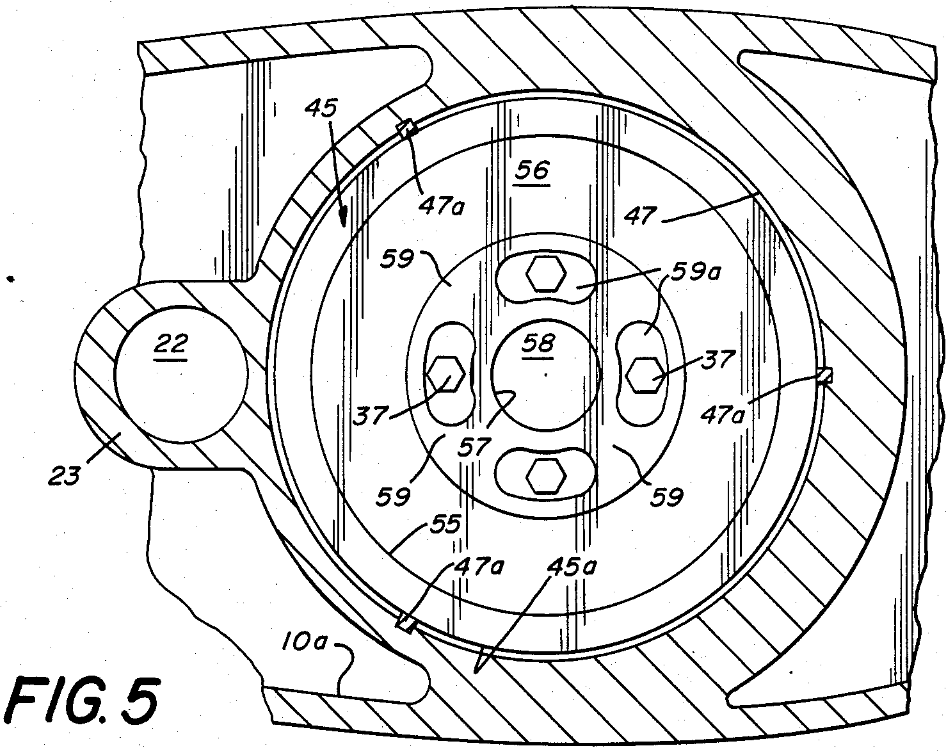
FIG. 5

FLUID PROPORTIONING APPARATUS

BACKGROUND OF THE INVENTION

The present invention relates to apparatus for admixing a foam-liquid solution with water in a predetermined proportion in a foam-water fire fighting system.

In foam-water fire fighting systems, the demand for the foam-liquid mixture can be expected to vary considerably depending upon the rate of application of the mixture. For example, it is not uncommon for the flow rate to vary from as low as 20 gpm to as high as 1000 gpm during fire fighting operations. In order to ensure satisfactory results, the foam should be mixed with water in a predetermined proportion, and the proportion should be relatively constant over the entire flow range. In order to maintain adequate pressure at the nozzle to ensure proper distribution of the mixture, the apparatus which admixes the foam with the water should create a minimum pressure drop in the supply line.

Another application requiring a very good turndown ratio, i.e., extremely accurate proportioning down to very low volumes, is the case of a sprinkler system for fighting fires in a warehouse or the like. In this application it is important to put an accurate percentage of additive, whether it is a foam type of liquid, a penetrating agent, or an ablative agent, into the fire fighting stream of water. Typically, the additive may consist of a 3% foam liquid. The main problem with a sprinkler facility is that it is unattended and it is not possible to know beforehand how much water is going to be required. Moreover, it is not known whether one sprinkler head is going to open or whether all of them are going to open and, in either case, it is necessary to be able to provide the right percentages of the water and additive.

Acknowledgement is made of the proportioning devices disclosed in U.S. Pat. Nos. 3,380,467; 3,647,002; and 4,064,891.

U.S. Pat. No. 3,380,467 discloses a proportioning apparatus particularly useful in the agricultural industry as a means for medicating the drinking water of livestock. The proportioning apparatus is usually mounted in the water feed line and serves to automatically and continuously mix predetermined quantities of a liquid additive, such as medication, to the drinking water delivered to the feed troughs for consumption by the livestock. The device consists of a diaphragm with a shuttle valve arranged so that the water from the water feed line enters on each side of the diaphragm to push the diaphragm back and forth. The diaphragm has a small piston pump to meter in the additive for the livestock drinking water. The device is constructed so that the faster the livestock drink the water, the faster the device operates to meter in more additive so that the livestock are provided with a constant amount of additive per gallon of water.

U.S. Pat. No. 3,647,002 discloses an apparatus used to admix a foam solution with water in a foam-water fire fighting system. The apparatus comprises a number of moving parts and is relatively complex in construction. Also, the patented valve structure is spring-loaded into a closed position whereby the water must act against increasing spring pressure and the water flow rate through the valve increases and this has the effect of increasing the pressure drop across the valve at higher flow rates and reducing pressure at the discharge nozzle. As a result, the effectiveness of distribution of the mixture may be significantly impaired.

U.S. Pat. No. 4,064,891 discloses apparatus for admixing a foam solution with water in a foam-water fire fighting system in a manner which accurately meters the amount of foam mixed with the water to ensure an optimum portion of foam to water over a wide range of flow rates of the foam-water mixture. The device of this patent uses a balanced pressure proportioning device and a float valve that floats on the stream. The float valve will sink in the water but it floats against the pressure drop and meters out the right amount of foam liquid, i.e., a certain fixed percentage of foam liquid. The device is constructed to put out a certain percentage of foam liquid additive regardless of how much water is coming through whereby if the float raises up to the top for high volume, then the restriction for the foam liquid opens up and lets a large amount of foam to go through. The device has a built in regulating valve which enables the maintaining of the approximate same pressure on the foam liquid side as you have on the water side. Accordingly, with the same pressure on the foam liquid as on the water, the metering valve is then sized to provide a very precise ratio. With this balanced pressure system there is provided an external foam pump usually driven by an electric motor which is triggered whenever there is some demand causing a pressure drop in the sprinkler system or in the fire hose or whatever.

SUMMARY OF THE INVENTION

In accordance with the invention there is provided a fluid proportioning apparatus which includes the features of the fluid proportioning apparatus incorporating the floating valve design and employes in this device a simple shuttle valve structure that directs the water supply from one side to the other side of a water motor piston. This motoring piston is arranged to drive a double-acting pumping piston for automatically mixing predetermined quantities of a liquid additive to the water. In operation, the shuttle valve moves back and forth between a pair of flow control positions for directing the inlet water alternately to opposite sides of the motoring piston to cause this piston to move back and forth and, by reason of its connection to the pumping piston, to cause the foam liquid to be pushed out of a pump cylinder at the required flow rate. The arrangement is such that the water supply line of the device takes water out of the fire main in an industrial plant, (or out of the fire pump on a fire truck) and uses this water pressure to work a piston to develop pressure of the foam liquid so as to boost up this foam liquid pressure to a pressure that is about the same as the water pressure in the fire main. Then the discharge of that pressurized foam liquid is delivered into the metering valve mechanism on the foam inlet side of the valve. This type of shuttle valve mechanism would do away with the necessity of the diaphragm valve that is now employed in the device employing the metering valve mechanism. More importantly, it eliminates the need for a gear pump and its electric driver requirement, which is especially advantageous in firefighting use because the electric power is generally shut off at the scene of a fire. Further, it will also do away with the modulating bypass valve that is shown in the prior art device.

With the arrangement of this invention, the flow driving the water motor will be dumped from the fire main into a drain since this water has to run off to atmosphere. However, this is actually an advantage because it provides a way that one can observe exactly how much foam liquid is going into the system. In the case of a sprinkler system, for example, it provides a "telltale" outside of the burning building on how many sprinklers are open inside the building, and with a minimum of waste water. In fire truck installation there would also be provided some form of "telltale" for the drainage flow from the water motor so that the firemen at the truck can tell that the right amount of foam liquid is being used for the particular fire fighting operation in use at a remote location.

BRIEF DESCRIPTION OF THE DRAWINGS

FIG. 4 is a sectional view taken generally on line 4—4 of FIG. 2.

FIG. 5 is a sectional view taken generally on line 5—5 of FIG. 2.

DESCRIPTION OF THE PREFERRED EMBODIMENT

Figure 1:
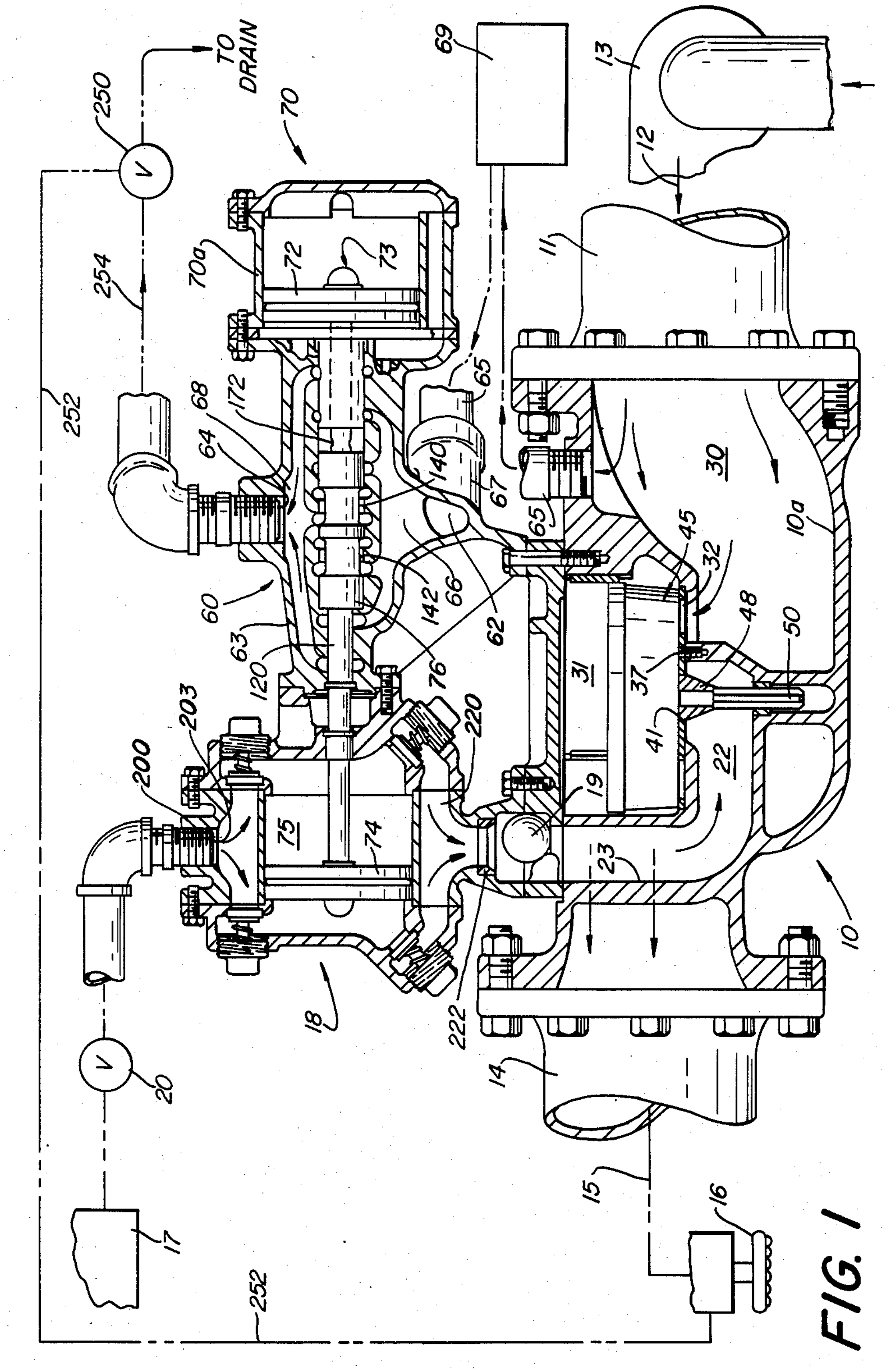
FIG. 1 is an elevational view, partly in section, of the fluid proportioning apparatus of the invention.

FIG. 1 illustrates a foam-water fire fighting system including a proportioning apparatus 10 in accordance with the invention. Proportioning apparatus 10 has an inlet 11 which is connected by a conduit 12 to the outlet of a supply pump 13 which, in turn, is connected to a source of water. Proportioning apparatus 10 has an outlet 14 which is connected by means of a supply line 15 to the sprinkler heads 16. In the case of a fire fighting system on a firetruck, the supply line 15 would be connected to the outlet nozzle of a fire hose. An additive liquid, such as a liquid foam additive, is contained in a storage tank 17 and is supplied to proportioning apparatus 10 under pressure by means of a piston additive pump indicated generally at 18 by way of a check valve 20. The outlet from the piston additive pump 18 is connected through a so-called sinking ball check valve 19 to a reservoir 22 contained within apparatus 10 by way of an internal passage 23 in apparatus 10.

The foam additive is supplied to the reservoir 22 at a pressure in the foam line slightly higher than the pressure in the main discharge pipe or foam solution header as will be described hereafter. The proportioning apparatus 10 is constructed and arranged so that the greater the flow in the discharge, i.e., at the sprinkler heads 16, the higher the flow through the proportioning apparatus 10 and the faster the piston additive pump 18 will operate (reciprocate) to keep up with the demand.

The proportion of foam additive to be admixed with the water depends on the type of foam additive utilized. Typically, the foam additive will be about 3% of the total flow. In fire fighting operations, it is important for this ratio to be maintained relatively constant without regard to the demand for the foam-water mixture and without regard to fluctuations in the water pressure supplied to the proportioning apparatus. In addition, it is important for the proportioning apparatus 10 to create a minimum of pressure drop in the supply line 15 to the sprinkler heads 16 in order to ensure adequate pressure to distribute the foamwater mixture effectively.

The apparatus 10 of the invention is capable of mixing with the water a predetermined amount of foam liquid additive in a relatively constant proportion over a wide range of demand flow rates for the foam-water mixture. To this end, the proportioning apparatus 10 has a cast body 10*a* with an interior cavity or inlet chamber 30 which is in fluid communication with the inlet 11 which is flanged for connection to a piping system. Body 10*a* of apparatus 10 also has an outlet chamber 31 which overlies the inlet chamber 30 and which is in fluid communication with the outlet 14 which is also flanged for connection to a pipe or the like. Fluid communication is provided between inlet chamber 30 and outlet chamber 31 by a plurality of annular ports 32 formed in a plate 35. Ports 32 are arcuate in shape and are circumferentially arranged in spaced apart relation. Plate 35 is disposed to extend horizontally between the chambers 30 and 31. Plate 35 is releasably fastened to the body of apparatus 10 by means of a plurality of bolts 37 in order to afford ready removal and replacement. The reservoir 22 is located interiorly of ports 32 and the plate 35 has a centrally located, circular orifice or port 41 which provides fluid communication between the interior of reservoir 22 and chamber 31. By this arrangement, water flows laterally into inlet chamber 30 and upwardly through the annular port 32 into outlet chamber 31 from which it flows laterally outwardly to the outlet 14. In a similar manner, foam liquid flows upwardly through the orifice 41 from reservoir 22 and mixes with the water in chamber 31 before flowing through the outlet 14.

Figure 2:
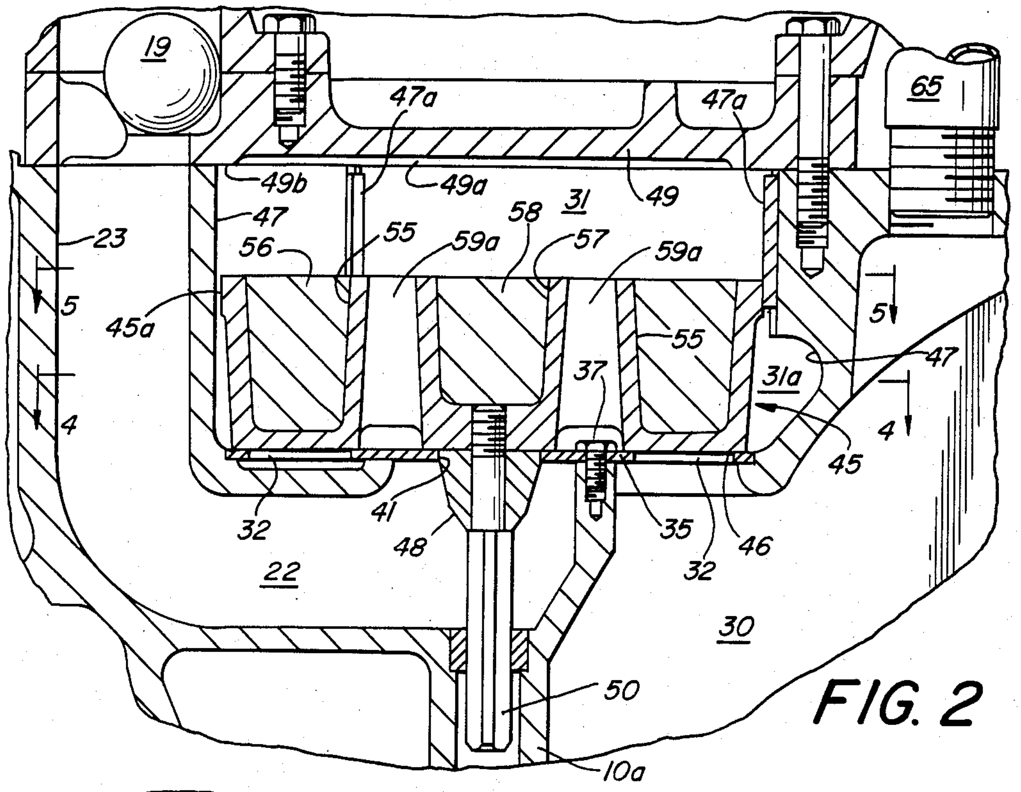
FIG. 2 is a detail view showing the main valve in its closed position.

In order to effect accurate metering of the liquid foam with the water in chamber 31, a valving member 45 is mounted for vertical displacement in chamber 31. As best shown in FIGS. 2 and 5, valving member 45 has a cylindrical configuration symmetrical with respect to a central axis extending in its direction of vertical movement. Valving member 45 has a planer annular bottom surface 46 which spans across ports 32 and seats against the upper surfaces of plate 35 when valving member 45 is in its lower limit position (FIG. 2). When in this position valving member 45 blocks the flow of water through the ports 32 and, at the same time, blocks flow of liquid foam through orifice 41.

Valving member 45 also has a tapered plug 48 which depends downwardly below plate 35 and through the orifice 41 into the interior of reservoir 22. Plug 48 has a frusto-conical peripheral surface which tapers at predetermined angles with respect to the vertical axis, the taper angles being related to the area of the orifice 41 in a prescribed mathematical relationship as determined by the desired foam-water proportion. Plug 48 has an axial dimension which corresponds to the displacement of valving member 45 in chamber 31, and the upper end or base is dimensioned so as to be received within orifice 41 with a slight clearance. Thus, the area between the surface of plug 48 and orifice 41 depends upon the elevation of valving member 45 in chamber 31, and the elevation of valving member 45, in turn, is dependent upon the rate of flow of water upwardly through ports 32. As the flow rate of water increases, the valving member 45 assumes higher elevations in chamber 31 to increase the area between orifice 41 and the peripheral surface of plug 48. As a result, an increased amount of foam liquid solution is permitted to flow into chamber 31 for admixing with the water as the water flows laterally to the outlet 14 along the underside of valving member 45. Of course, as the water flow rate decreases, valving member 45 moves downwardly, and plug 48 cooperates with the orifice 41 to permit a smaller quantity of foam liquid additive to admix with the water. With this structure, valving member 45 tends to float on the current of water flowing through ports 32, and this action creates a minimum of interference with the flowing water. Thus, the pressure drop of water as it flows through the proportioning apparatus 10 is minimized, thereby maximizing the delivery pressure of the foam water mixture at sprinklers 16.

In the illustrated embodiment, the taper angle of plug 48 varies along the length of the plug. As shown in the Drawings, the taper angle is increased adjacent the lower end of the plug in order to provide an increased orifice flow area at greater water flow rates. This has the effect of increasing the proportion of foam additive to water at high flow rates to richen the foam-water mixture. It will be apparent, however, that the taper angle may take various shapes to provide the desired flow rates and consequently proportioning ratios for the particular application.

Valving member 45 is guided vertically in chamber 31, and there is provided means to limit its upward movement therein. To this end, valving member 45 has a radially extending peripheral flange 45*a* around its upper end and chamber 31 is defined at its upper portion by a cylindrical wall 47 which has three vertical guides 47*a* keyed therein. Guides 47*a* are circumferentially equally spaced around wall 47 and project therefrom to slidably contact flange 45*a* for guiding valve member 45 in its vertical movement. A wall 49 defines the top of chamber 31 and extends transversely to the path of movement of valving member 45. Wall 49 has a central recessed portion 49*a* and an annular peripheral shoulder 49*b* located adjacent a cylindrical wall 47. Shoulder 49*b* provides an abutment surface for contacting the upper surface of the peripheral flange 45*a* of valving member 45 to limit its upward movement in the chamber 31. Preferably, shoulder 49*b* is located so as to prevent the lower end of plug 48 from elevating the plug 48 above the orifice 41 when valving member 45 is in its upper limit position.

Proportioning apparatus 10 is relatively compact, affording installation in environments where there are critical spacial limitations, such as on board a ship. To this end, valving member 45 has a disc-like configuration with a dimension along the vertical axis less than its diameter. Flange 45*a* is relatively thin as compared to the thickness of valving member 45 and is constructed and arranged to contact guides 47*a* so as to be spaced radially inwardly from the surface of wall 47 to provide an annular flow passage to the upper portion of chamber 31 from the underside of valving member 45 for a purpose to be described hereinafter.

In order to prevent valving member 45 from tilting as it moves vertically in chamber 31, valving member 45 is provided with a pilot pin or stem 50 which depends therefrom and which is slidably received in a bearing or bore in the bottom of reservoir 22. Stem 50 is disposed axially with the longitudinal vertical axis of valving member 45 and has a length greater than the displacement thereof. Stem 50 is threaded into the bottom of valving member 45. By this arrangement stem 50 operates to prevent valving member 45 from tilting as it elevates into chamber 31. Moreover, plug 48 may be readily removed and replaced in the event it becomes desirable to change the foam-water proportion.

Valving member 45 is biased downwardly into the position shown in FIG. 1 for blocking fluid flow through annular port 32 and orifice 41. The downward bias is provided by a means which applies a substantially constant force to the valving member 45 in the direction of lower cavity 30 regardless of the elevation of valving member 45 in chamber 31. To this end, valving member 45 carries a mass of a predetermined weight which biases it downwardly by gravity against the seats provided by plate 35.

Valving member 45 is preferably fabricated of steel or cast iron and has an upwardly open peripheral channel 55 which is filled with a quantity of denser material 56, such as lead. Valving member 45 also has an upwardly open central recess 57 which is also filled with a quantity of lead 58. The peripheral channel 55 is connected to the central recess 57 by a plurality of radially extending webs 59 and the flat lower surface of valving member 45 is recessed intermediate the inner recess 57 and channel 55 to accommodate the heads of the plate mounting bolts 37 when valving member 45 is in its downwardmost flow blocking position (see FIG. 2). By this arrangement, valving member 45 has a center of gravity which is located below its flange 45*a* and a relatively constant force is applied downwardly to valving member 45 regardless of its elevation in chamber 31. As a result, the biasing force on valving member 45 does not increase with increased flow rate whereby the pressure drop through the proportioning apparatus 10 remains relatively constant over a wide range of demand flow rates. Thus, adequate pressure at the outlet nozzle is maintained to effect proper distribution of the foam-water mixture.

Valving member 45 is designed to unseat when a pressure differential of about 2 psi is applied across inlet 11 and outlet 14 of the proportioning apparatus 10. In addition, the apparatus is designed so that rapid oscillatory movement of valving member 45 in chamber 31 is minimized. For this purpose, a plurality of apertures 59*a* are provided in valving member 45 intermediate webs 59. Apertures 59*a* permit a small quantity of water to flow upwardly therethrough into the upper portion of chamber 31 as soon as valving member 45 moves away from its seat a slight amount as a result of a pressure differential applied across the inlet and outlet. In addition, the annular space between flange 45*a* and wall 47 permits water in the chamber 31 above valving member 45 to drain therefrom into the outlet 14. The presence of water in the upper portion of chamber 31 functions to dampen rapid upward movement of the valving member 45 in chamber 31 thereby limiting oscillation of valving member 45 in chamber 31 due to rapid changes in fluid pressure and/or flow rates. Furthermore, a pressure recovery plenum is provided by an outwardly offset portion 47*b* of wall 47 which surrounds mounting member 45 and defines a recess 31*a*. It is noted that the vertical extent of recess 31*a* is less than the thickness of valving member 45 so that annular flange 45*a* engages guides 47*a* in chamber wall 47 above the top of recess 31*a* when valving member 45 is in its lower limit position (see FIG. 2).

Mounted on top of the proportioner body 10*a* are the piston additive pump 18, a directional valve 60 and a piston water motor 70, these devices being mounted adjacent one another in suitable housings as shown in FIG. 1. The mounting for these devices is conventional and uses mounting bolts as shown in the Drawings.

The directional valve 60 comprises an elongated main valve housing 63 having a two diameter longitudinal extending central bore 61, inlet and discharge means including diametrically opposed inlet and discharge ports 62 and 64, respectively, which communicate with inlet and discharge manifolds 66 and 68, respectively, in the housing. The directional valve housing consists of an upper section 60*a* and a lower section 60*b* for ease of construction and assembly of the directional valve 60. Water at supply line pressure is delivered to inlet port 62 by a conduit 65 which, at one end, communicates with inlet cavity 30 and which, at its other end communicates with a flow fitting 67 leading to inlet port 62. A filter 69 is provided in conduit 65 to filter the water prior to entering the directional valve 60.

Figure 9:
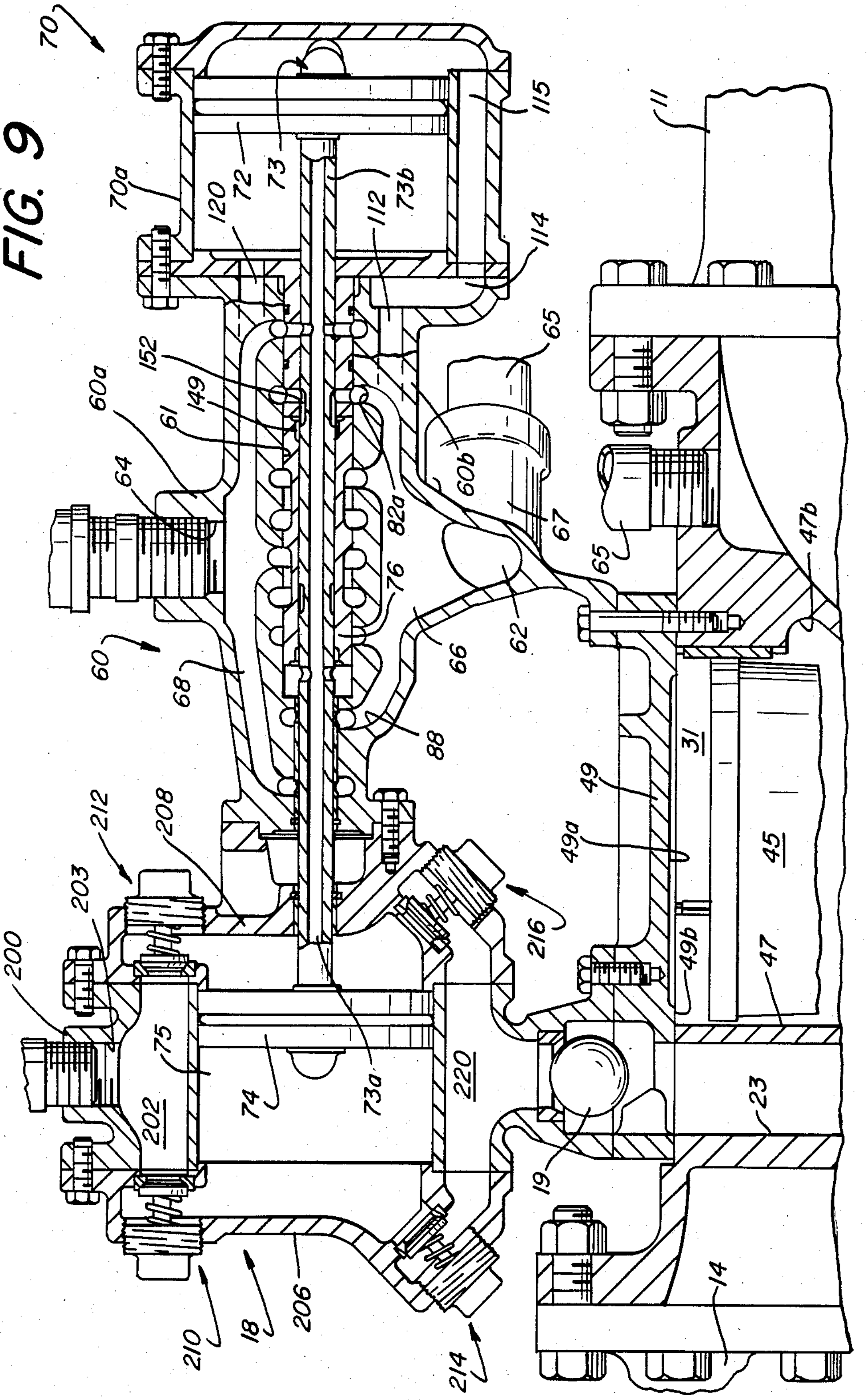

A water motor housing 70*a* is mounted at the right end of the valve housing sections 60*a* and 60*b* and supports therein a water motor piston 72 mounted for reciprocation within a cylinder chamber 71 between an inner left hand limit position (shown in FIG. 6) and an outer right hand limit position (shown in FIG. 9). A piston rod assembly 73 is mounted for movement in the central bore 61 and is connected at one terminal end to the water motor piston 72 and its opposite terminal end to a additive pump piston 74 mounted for reciprocal movement in a cylindrical additive chamber 75 in fluid communication with the additive supply tank 17. A control shuttle spool 76 is slidably mounted on the exterior of piston rod assembly 73 at approximately the midpoint thereof and is adapted for reciprocating motion axially relative thereto within the enlarged diameter portion of bore 61 between one limit position designated a first left hand limit position (see FIG. 6) and an opposite limit position, designated a second right hand limit position (see FIG. 7).

Briefly stated, the broad components of the apparatus (including piston additive pump 18, directional valve 60 and piston water motor 70) in terms of function operate such that water under supply line pressure enters the inlet port 62, flows through the inlet manifold 66 where the shuttle spool 76 is in one limit position and the water is directed through various ports and channels into cylinder chamber 71 on the left (or inner) side of piston 72. As the left side of chamber 71 is filled, the piston 72 is displaced axially to the right and is moved toward its outer right hand limit position. During this movement of piston 72, the piston rod assembly 73 is moved therewith causing piston 74 to move to its right hand limit position. Also, as piston 72 moves to the right, water in the piston chamber 71 on the right side of piston 72 is displaced through ports and channels to the discharge manifold 68, the position of the shuttle spool 76 permitting flow in the manner outlined above. Also, during this stroke of the piston rod assembly 73, additive fluid in the additive chamber 75 is pumped by the additive piston 74 to reservoir 22 by way of valve 19 and passage 23. As this piston rod assembly 73 and pistons 72 and 74 approach their right hand limit positions, a bypass chamber in the piston rod assembly 73 is brought into registry with the inlet manifold 66 whereby water pressure pushes the shuttle spool 76 into its other limit position (see FIG. 10).

In this other position of the shuttle spool 76, flow of water from the inlet manifold 66 to the cylinder chamber 71 is reversed; that is, water from the inlet manifold is now directed into the cylinder chamber 71 on the right side of piston 72 whereby the axial movement of this piston 72 and piston rod assembly 73 is reversed and the water in the left side piston chamber 71 is vented to the discharge manifold 68.

As the piston rod assembly 76 is moved in the manner discussed above, a predetermined quantity of additive is drawn into the additive supply chamber 75 by the piston 74 and on the reverse stroke of the piston rod assembly 76, the predetermined quantity of additive is discharged into reservoir 22 from which it is mixed with the predetermined quantity of primary liquid flowing past metering valve 45. By this arrangement, during continued operation of the proportioning apparatus, which simply relies on the pressure of the primary fluid, predetermined quantities of additive are continuously mixed and blended with a predetermined controlled quantity of the primary fluid, water.

Considering now in detail the specific arrangement of the apparatus, and with particular reference to FIGS. 6–11, the inlet manifold 66 has four axially spaced legs 82, 84, 86 and 88, which communicate with four axially spaced annular grooves defining inlet passages 82*a*, 84*a*, 86*a* and 88*a* in the central bore 61 of the valve housing 60*a*. The discharge manifold has three axially spaced legs 92, 94 and 96 which communicate with three axially spaced annular grooves defining outlet passages 92*a*, 94*a* and 96*a*, respectively, in the central bore 61 of the valve housing 60*a*.

As shown in the Drawings, the passages in direct communication with the inlet manifold 66 are staggered, or offset, relative to the passages in direct communication or alignment with the discharge manifold 68, the outer outlet passages 92*a* and 96*a* being outboard of the outermost inlet passages 82*a* and 88*a* and the central annular outlet passage 94*a* being disposed between the innermost annular inlet passages 84*a* and 86*a*. A pair of annular grooves defining transfer passages 89 and 91 are provided in the central bore of the valve housing on either side of the central outlet passage 94*a* and inboard of the inner pair of inlet passages 84*a* and 86*a*. The outlet passage 94*a* and transfer passages 89 and 91 are axially spaced apart a uniform distance, the purpose of which will be apparent later.

An elongated tubular portion 100 of water motor housing inner cover 70*b* is mounted in central bore 61 of the valve housing at the right hand end of the shuttle spool 76. The tubular portion 100 has a pair of diametrically opposed radial outlet ports 102 communicating with the outlet passage 92*a* and a pair of diametrically opposed radial inlet ports 104 communicating with the inlet passage 82*a*.

The transfer passage 91 is connected to an elongated axially extending bore 112 in the lower valve housing 60*b*, the bore 112 being connected to the transfer passage 91 by a short bridging port 111. A second elongated axially extending bore 120 is provided in the upper valve housing 60*a*, this bore 120 communicating at one end with the inner end of piston chamber 71 and at its opposite end with the transfer passage 89 through bridging port 113. Bore 112 is connected at its right hand end to a reservoir 114 which in turn communicates through a passage 115 to the outer end of the piston chamber 71.

A short tubular sleeve 126 is mounted in the center bore 61 of the valve housings 60*a* and 60*b* adjacent the left end of the shuttle spool 76, the sleeve 126 having a pair of diametrically opposed radial inlet ports 128 communicating with the annular inlet passage 88*a* and a pair of diametrically opposed radial outlet ports 130 communicating with the outlet passage 96a. The radial outlet ports 130 also communicate with the axial internal passage 73a of the piston rod assembly 73 through a pair of aligned short branch ports 170 therein. The confronting axial end faces of tubular portion 100 and sleeve 126 are spaced apart an axial distance greater than the length of the shuttle spool 76 to permit movement of the shuttle spool 76 between limit positions.

The shuttle spool 76 is an elongated tubular member having a pair of annular cuts in its outer periphery defining side-by-side flow chambers 140 and 142 which are separated by a circumferentially extending dividing land 144. Each of the channels 140 and 142 is of a predetermined axial length to span or bridge a pair of adjacent annular passages in the group between the inlet passages 84a and 86a when the shuttle spool 76 is disposed at either opposite limit position to thereby control the flow path of water through the directional valve 60. More particularly, channels 140 and 142 are located relative to the axial ends of the shuttle spool 76 so that when the shuttle spool 76 is in a first or left hand limit position (FIG. 10) the flow control channel 140 bridges the passages 89 and 94a permitting flow of water from the inner end of piston chamber 71 to the discharge manifold 68, and the flow channel 142 bridges passages 91 and 86a permitting flow of water from the inlet manifold to the outer end of piston chamber 71. In the second or right hand limit position of the shuttle spool 76 (FIG. 7), the flow control channel 140 bridges passages 84a and 89 and the flow channel 142 bridges passages 94a and 91 permitting reverse flow, that is, flow of water into the inner end piston chamber 71 and discharge flow from the outer end piston chamber 71. The parts are constructed so that the spacing between the tubular portion 100 and sleeve 126 is chosen so that the gap between the shuttle spool 76 and the end face of one of these parts is approximately equal to the spacing between the center line of adjacent passages of the group between inlet passages 84a and 86a so that the flow control channels 140 and 142 bridge the selected passages at either opposite limit position as described above.

The shuttle spool 76 has annular recesses 149 and 151 in opposite axial end faces thereof, which, when the undercut recesses 152 and 154 on piston rod assembly 73 are aligned with the inlet manifold through passages 82a and 88a, facilitate movement of the shuttle spool 76 between its limit positions by water pressure.

Considering now the structural details of the piston rod assembly 73, it is noted that this assembly comprises a tubular piston rod 73b having an internal passage 73a extending axially therethrough. At a central section of the piston rod 73b there is provided undercuts or recesses at the outer periphery thereof defining a pair of annular chambers 152 and 154 to facilitate flow of water therethrough to actuate the shuttle spool 76 when the piston rod 73b is disposed at opposite limit positions and at a time when the chambers 152 and 154 register with the inlet passages 82a and 88a, respectively. The piston rod 73b is also provided with radial vent ports 170 and 172 communicating with internal passage 73a for venting water flow as shuttle spool 76 moves between its limit positions.

The piston additive pump 18 has a housing 200 defining an inlet chamber 202 and having a threaded inlet port 203 which receives flow from the outlet side of the check valve 20. The pump 18 also comprises a pair of side housing members 206 and 208 bolted to the housing 200 as shown in the Drawings and comprising a pair of flow control valves 210 and 212 which control flow from inlet chamber 202 to the inner and outer ends, respectively, of the cylinder chamber 75. Side housing members 206 and 208 also have mounted therein a pair of flow control valves 214 and 216 for controlling flow from chamber 75 from the outer and inlet sides of piston 74 to an outlet chamber 220 formed at the lower end of the piston additive pump housing as shown in the Drawings. The outlet chamber 220 communicates with the upstream side of ball valve 19 through a valve seat 222.

Figure 6:
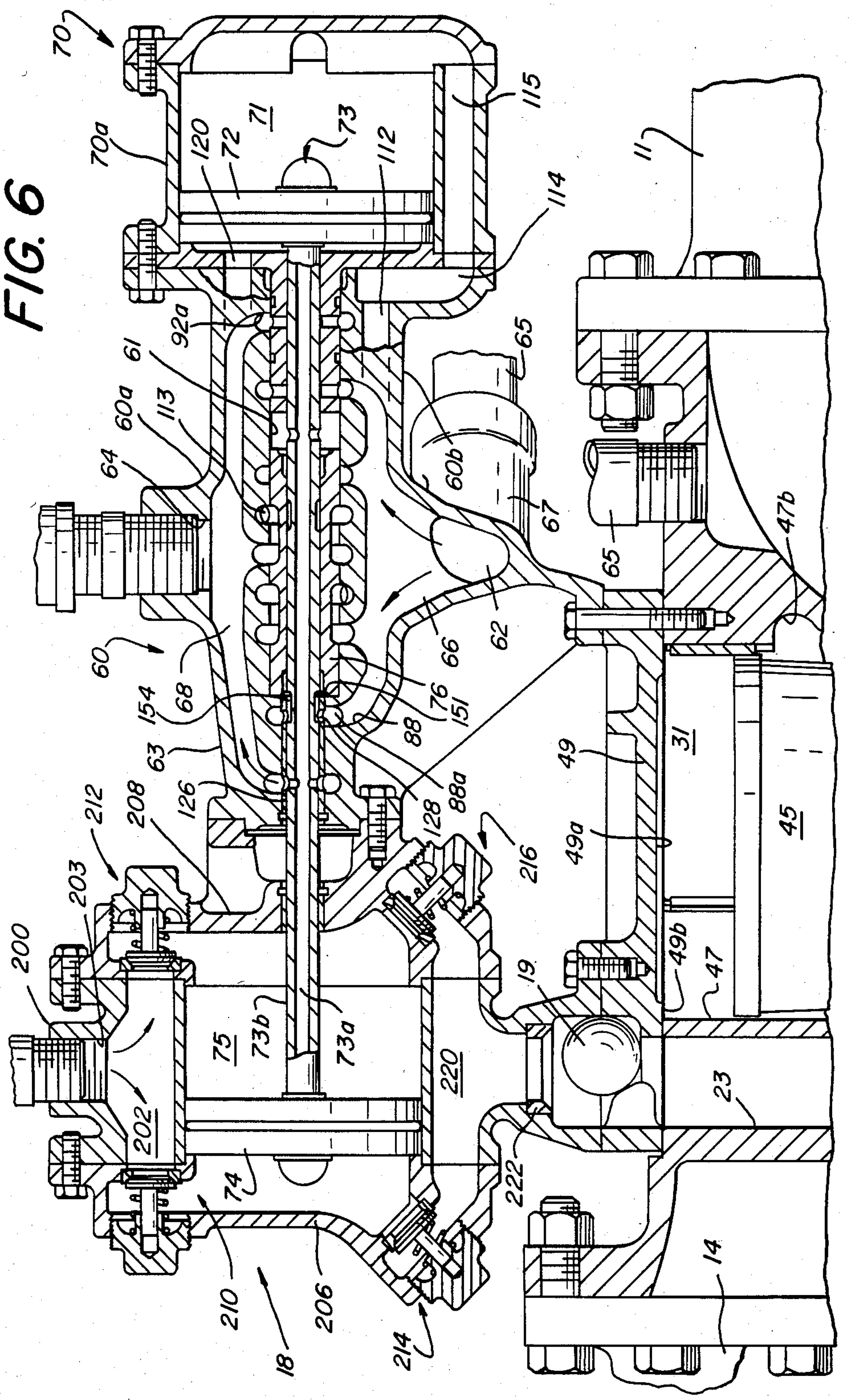
FIGS. 6-11 are enlarged fragmentary sectional views showing the shuttle spool and the piston assembly in successive operative positions during the operation of the apparatus of the invention.

In the operation of the piston additive pump 18, as the piston moves from the outer or left hand position shown in FIG. 6 toward the inner or right hand position shown in FIG. 9, the piston functions to pull liquid foam from inlet chamber 202 through valve 210 into chamber 75 on the outer side of piston 74 and to force liquid foam from chamber 75 through valve 216 into outlet chamber 220. Likewise, when piston 74 is moved from its inner or right hand position toward its outer or left hand position, the piston 74 drawns liquid foam from inlet chamber 202 through valve 212 into chamber 74 on the inner side of piston 74 and forces liquid foam from chamber 75 on the outer side of piston 74 through flow control valve 214 into the outlet chamber 220.

OPERATION

When the apparatus of the invention is set up for a total automatic operation, the system normally would be pressurized with water up to the sprinkler heads. It will be noted, however, that the system could be drained and pressurized with air if desired for operation under freezing conditions, this being well known in the art. For purposes of the description of the operation of the proportioning apparatus of the invention, it is assumed that the parts initially are in the condition shown in FIG. 1 with the entire system pressurized with water throughout as is shown in this figure. As soon as a pressure drop occurs in the discharge piping from the proportioner 10, as by the opening of the sprinkler heads 16, a pressure-operated drain valve 250 opens by reason of its connection, through line 252, to be responsive to the pressure in discharge line 15. Drain valve 250 is arranged to control the flow through a drain line 254 connected to discharge port 64. When the drain valve 250 opens, there is caused a pressure differential on the piston water motor 70 (and also on the shuttle spool 76 of directional valve 60) whereby the pumping action of the piston 72 and piston rod assembly 73 is started. The piston additive pump 18, which has its piston 74 mounted on piston rod assembly 73, also starts its pumping action, as will be described in detail hereafter.

The discharge pressure of the piston additive pump 18 will rise to meet the system pressure, the pressure building up in reservoir 22 to a pressure that corresponds to the water main pressure that causes the valving member 45 to be lifted. When valving member 45 opens, the pressure in chamber 22 is exposed to the water main pressure and the parts are constructed and arranged so that the pressure in reservoir 22 will balance itself to the pressure required so that flow will occur through the orifice 41 of proportioner 10. To this end, there is provided enough force by the piston additive pump 18 to generate that pressure, piston 72 of water motor 70 being designed so as to produce the necessary pressure build up. More specifically, the pistons 72 and 74 are sized so that they will produce enough pressure to overcome both the mechanical friction forces and the hydraulic pressure forces required for giving enough pressure to overcome the flow losses down to the orifice 41. For this reason, the diameter of the water motor piston 72 is slightly larger than the diameter of the additive pump piston 74 whereby there is provided an extra force required for the foam liquid flow and to overcome the friction forces thereon.

The opening of the sprinkler heads 16 also causes a pressure drop in the "main" and a pressure differential across the floating valving member 45 in the proportioner 10 thereby causing the flow to lift the same and permit both water and foam-liquid additive to flow past the floating valve member 45 and mix together in the discharge outlet 14 leading to the sprinkler heads 16. The operation is such that the greater the flow through the sprinkler heads 16, the higher the floating valving member 45 will rise and the faster the water motor 70 and additive pump 18 will run (reciprocate) to keep up with the demand and to maintain a pressure in the additive flow line (including passage 23 and reservoir 22) slightly higher than the pressure in the main discharge pipe.

Figure 7:
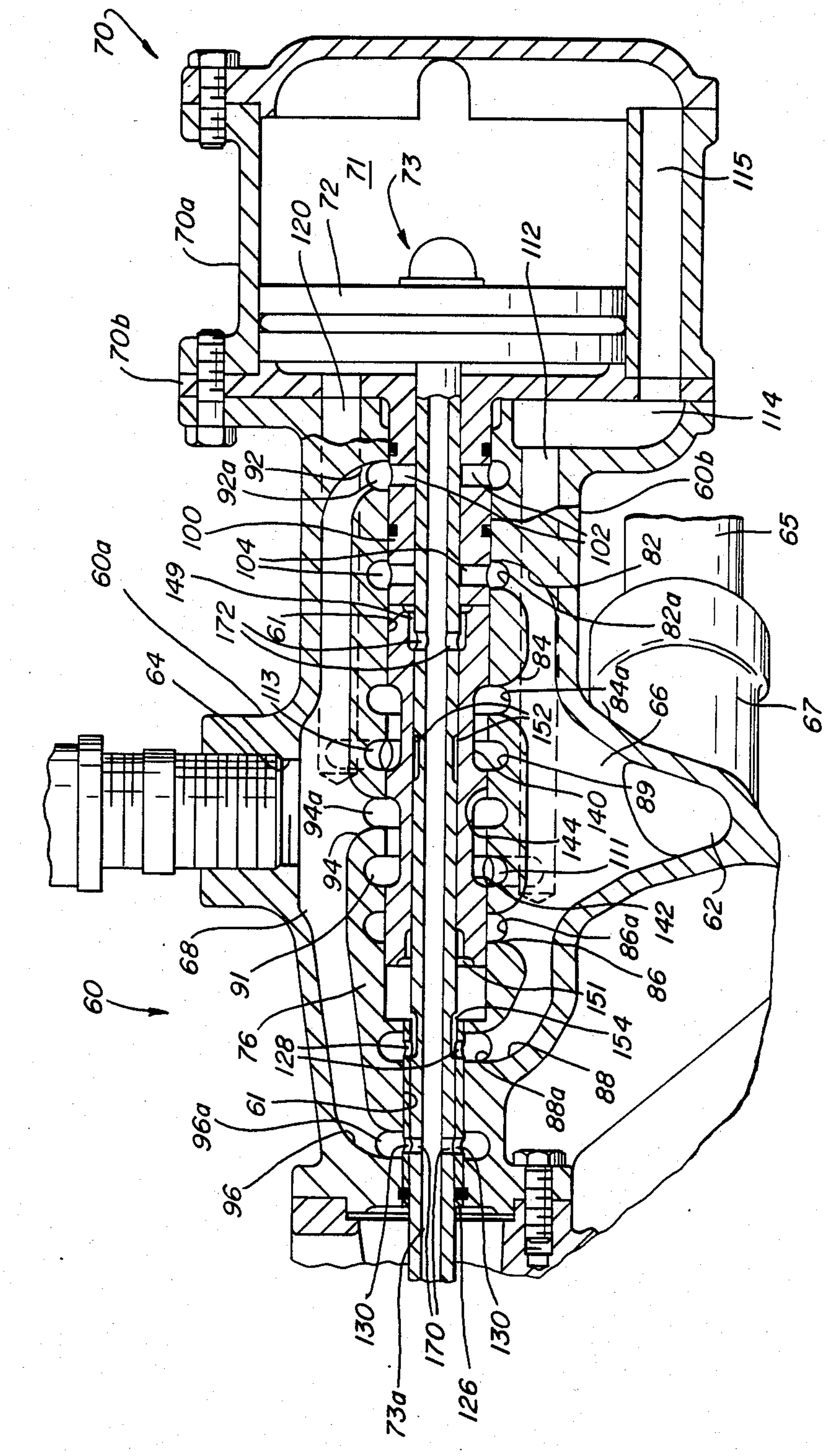
Figure 8:
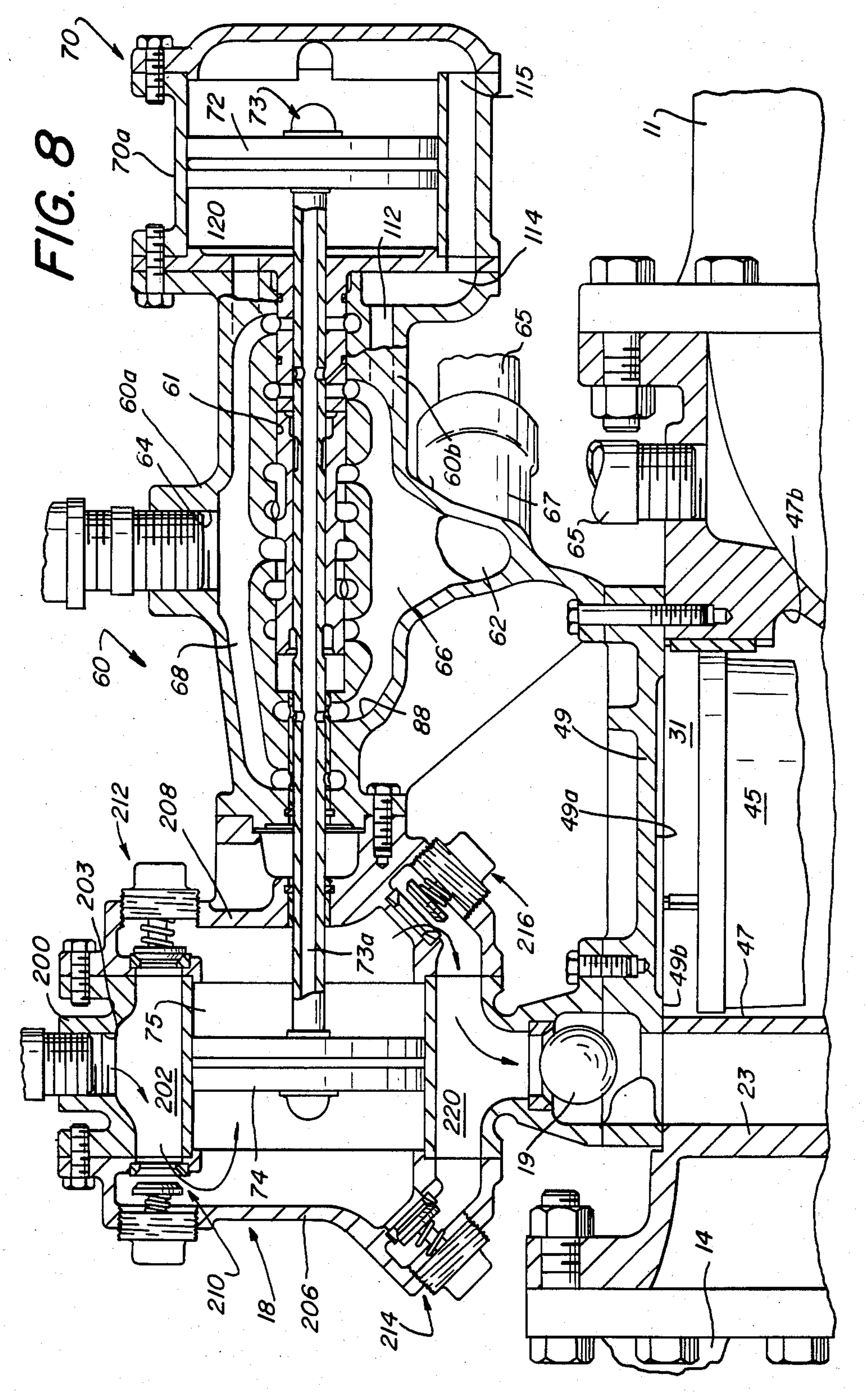

As to the specific operation of the directional valve 60 in controlling operation of the water motor 70 to cause the additive pump 18 to supply the proper quantity of additive, it is assumed initially that the parts are in the condition as shown in FIG. 6. In this position, shuttle spool 76 is in the left hand limit position and the piston rod assembly 73 is in its left hand limit position. After drain valve 250 opens, the first thing that occurs is that the liquid in the inlet manifold 66 will flow therefrom into the recess 151 at the left hand end of shuttle spool 76 causing this spool to move to the right hand limit position as shown in FIG. 7. It is noted that the water in the space between the end of tubular portion 100 and the right end face of shuttle spool 76 vents through the discharge passage 96*a* to the discharge manifold 68 as it flows from the vent ports 172 and axial passage 73*a* in piston rod 73*b* to ports 170 and 130.

Now, when the shuttle spool 76 is in its second or right hand limit position abutting the axial end face of tubular portion 100, the flow control channel 140 bridges the inlet passage 84*a* and transfer passage 89, and the flow control channel 142 bridges the outlet passage 94*a* and the transfer passage 91 (see FIG. 7). In this position of the shuttle spool 76, water from the inlet manifold 66 can flow through inlet passage 84*a*, transfer passage 89, and bridging port 113 to bore 120 and into the chamber 71 on the inner left hand side of piston 72 for moving piston rod assembly 73 to the right to the position shown in FIGS. 8 and 9. During this stroke of the piston assembly 73, water in chamber 71 on the outer or right side of piston 72 flows through passage 115, reservoir 114, axial bore 112, briding port 111 and into transfer passage 91. Transfer passage 91 is now in fluid communication with the central outlet passage 94*a* through flow control channel 142 so that water discharges into discharge manifold 68. During movement of the piston rod assembly 73 to the right in the manner described above, the additive pump piston 74 draws a predetermined quantity of additive through the inlet check valve 210 into the additive chamber 74 and pumps a predetermined amount thereof through check valve 216 to outlet chamber 220 and to reservoir 22 to mix with water flowing through valving member 45. This is shown by the mid position shown in FIG. 8.

Figure 11:
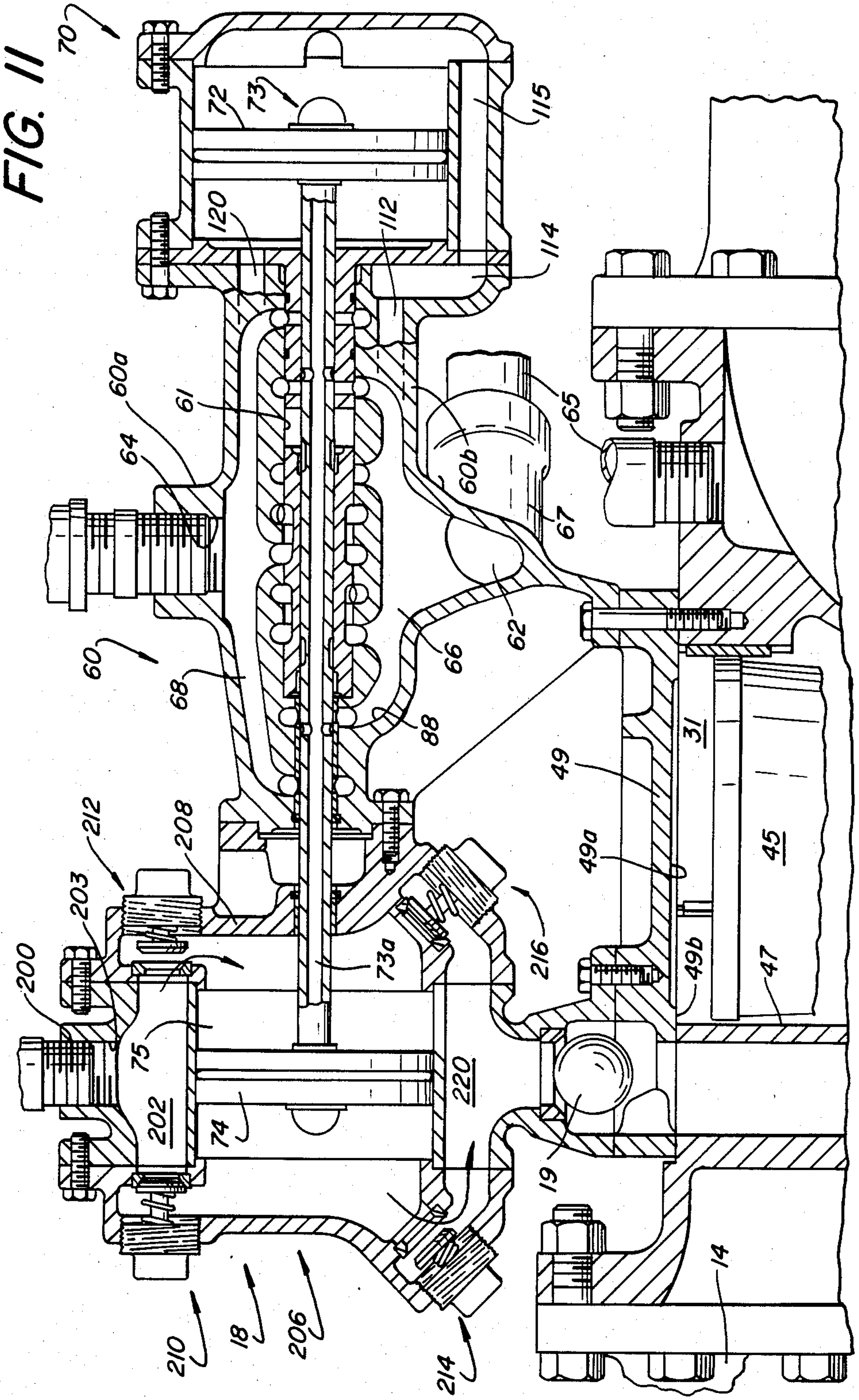

It is noted that when the parts reach the "bottom" position as shown in FIG. 9 all four control valves 210–216 in the additive pump 18 would close momentarily as is shown in FIG. 9. Once the piston rod assembly 73 starts to move to the left the valves 210–216 will assume the position as shown in FIG. 11.

Figure 10:
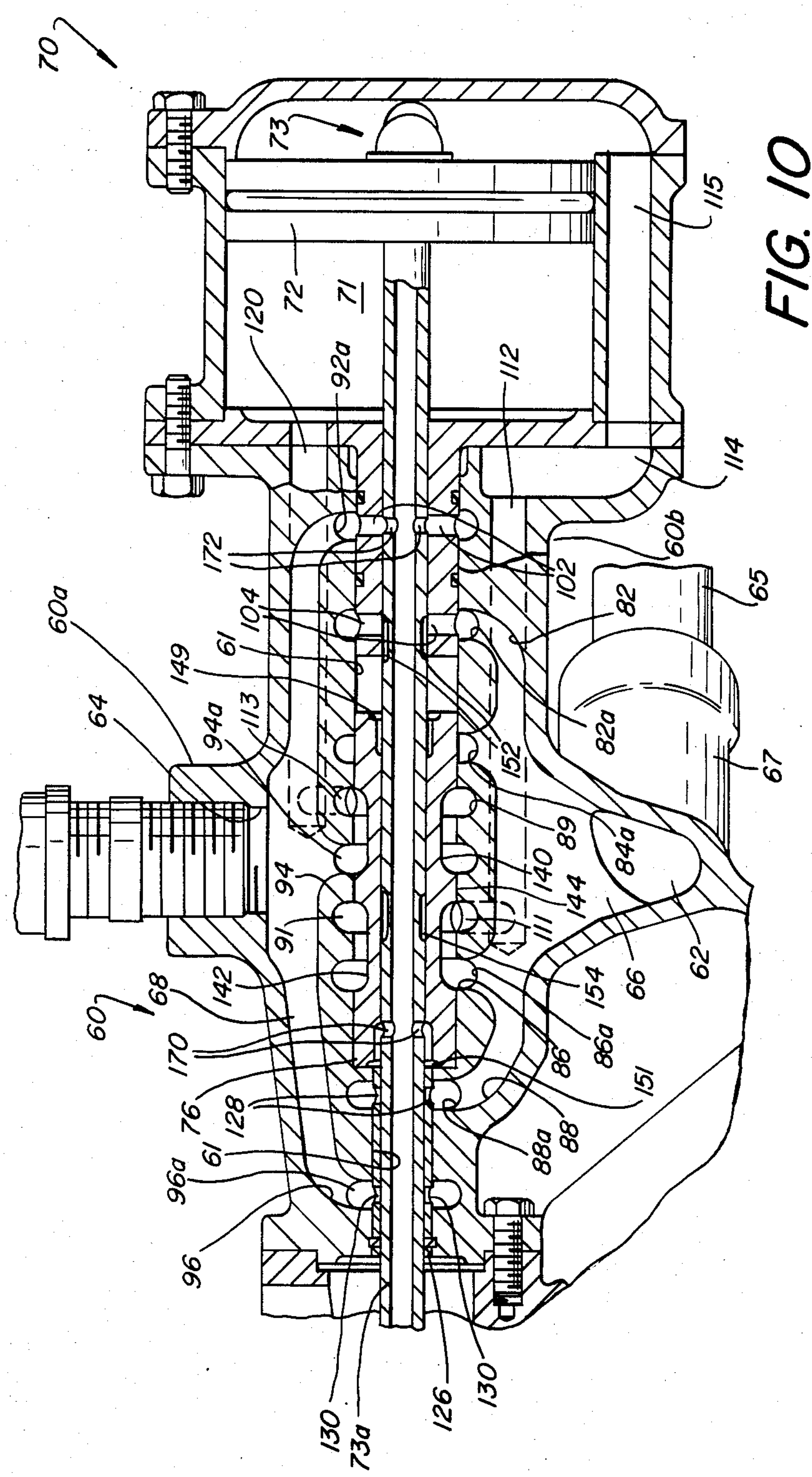

Now, when the piston rod assembly 73 has reached its outer or right hand position as shown in FIG. 9, annular chamber 152 of the piston rod 73*b* registers with inlet port 82*a* to admit water under pressure from inlet manifold 66 into annular recess 149 in the right axial end of shuttle spool 76 to move it to the left back to the first limit position (see FIG. 10). The water in the space between the axial left end of shuttle spool 76 and sleeve 126 is vented by flowing through ports 170, axial chamber 73*a*, ports 172 and outlet port 92*a* to the discharge manifold 68 to permit displacement of the shuttle spool 76 to the left.

Figure 3:
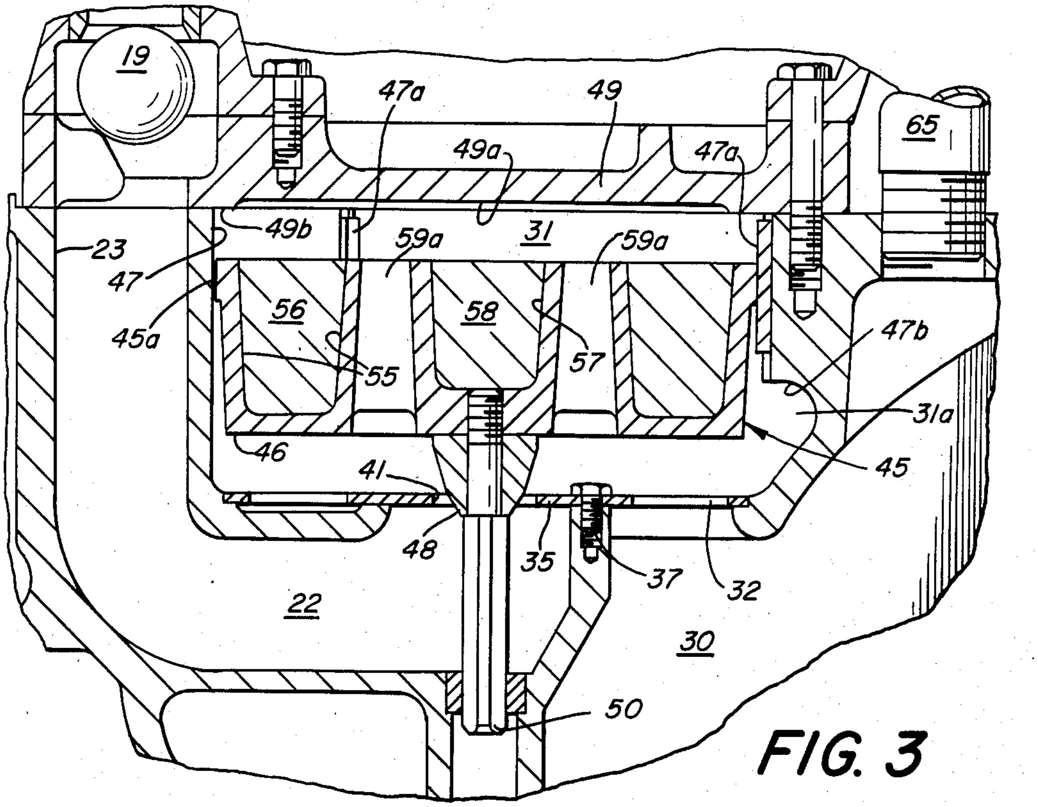
FIG. 3 is a detail view showing the main valve in an open position.

Now, with shuttle spool 76 in the original position as discussed above, the flow of water in the apparatus is reversed so that the piston rod assembly 73 is moved back to the left. During movement of the piston rod assembly 73 to the left, the additive is drawn into the additive chamber 75 through control valve 212 and is displaced through control valve 214 to outlet chamber 220 and to reservoir 22 so that the predetermined quantity of additive displaced is mixed and blended with the predetermined quantity of water flowing through valving member 45 (See FIGS. 3 and 11). It is noted that when the shuttle spool 76 is in the first or left hand limit position as shown in FIG. 10, the inlet passage 86*a* and the transfer passage 91 are in flow communication through the flow control channel 142, and the outlet passage 94*a* and the transfer passage 89 are in flow communication through the flow control channel 140. Thus, when the device is in operation with the parts in the position shown in FIG. 10, water from the inlet manifold 66 can flow through the communicating inlet passage 86*a* and transfer passage 91 and through bridging port 111 to bore 112 and then through reservoir 114 and passage 115 to chamber 71 on the outer or right hand side of piston 72. Further, water in chamber 71 on the inner or left hand side of piston 72 can be displaced by the piston 72 as it moves inwardly (to the left) and flow through the bore 120, bridging port 113, transfer passage 89, and outlet passage 94*a* to the discharge manifold 68. Additionally, additive liquid in the additive chamber 75 is displaced by the piston 74 as it moves along with piston 74 to pump additive through control valve 214 as was described above. Also, additive flows into the additive chamber 75 behind the moving piston 74 through the control valve 212 as was described above. As the piston rod assembly 73 reaches its extreme inner (left hand) limit position as shown in FIG. 6, the annular bypass chamber 154 registers with the inlet port 88*a* and sleeve 126 at ports 128 so that the water in inlet manifold 66 now acts on the annular recess 151 in one axial face of the shuttle spool 76 and moves it to the right to the position shown in FIG. 7.

In the operation of the device of the invention, shuttle spool 76 and piston rod assembly 73 continually cycle in the manner described above to blend or mix predetermined quantities of the additive with predetermined quantities of water.

What is claimed is:

1. Apparatus for admixing a secondary fluid, such as a foam-liquid solution, with a primary fluid, such as water, in a predetermined proportion comprising:

a proportioner including a body having an inlet and an inlet chamber in fluid communication with said inlet, said body having an outlet and an outlet chamber in fluid communication with said outlet;

valve seat means defining a primary port providing fluid flow communication between said inlet chamber and said outlet chamber;

valving means extending across said primary port and mounted for movement between a closed position blocking fluid communication through said primary port between said inlet and outlet chambers and a variably open position spaced from said primary port providing fluid flow communication through said primary port so that the primary fluid may flow through said body from said inlet to said outlet;

means biasing said valving means in the direction of said primary port into said flow blocking position;

first conduit means providing a fluid flow conduit in said body for containing the secondary fluid to be proportioned with said primary fluid in said outlet chamber;

means associated with said first conduit means and providing a secondary port opening into said outlet chamber interiorly of said primary port;

means carried by said valving means and disposed within said secondary port for cooperating therewith to meter the flow of said secondary fluid from said first conduit means and into said outlet chamber in relation to the spacing of said valving means from said primary port as determined by the flow of primary fluid;

means supplying said primary fluid at a main pressure to said inlet to said proportioner;

a supply of secondary fluid; and means delivering said secondary fluid from said supply thereof to said first conduit means at a pressure approximating said main pressure including a directional valve means including a valve housing having an inlet and an inlet chamber in fluid communication with said inlet, and an outlet and an outlet chamber in fluid communication with said outlet, and second conduit means delivering said primary fluid to said inlet of said valve housing from said supply thereof, a piston water motor means mounted at one end of said valve housing and having a first piston dividing a first piston chamber into a pair of first chambers, a piston pump means mounted at an opposite end of said valve housing and having a second piston dividing a second piston chamber into a pair of second chambers, and a piston rod assembly mounted for axial sliding movement in said valve housing and having said first piston mounted at one end thereof and said second piston mounted at the other end thereof, said piston assembly and said first and second pistons being supported for reciprocating movement, said directional valve including a shuttle spool in the valve housing adapted for axial sliding movement relative to said piston rod assembly between a first control position and a second control position, said shuttle spool being constructed and arranged so that in said first control position thereof it establishes fluid communication between said directional valve inlet chamber and one of said first piston chambers on one side of said first piston and fluid communication between the other of said first piston chambers on the other side of said first piston and said directional valve outlet chamber whereby flow of primary fluid from said directional valve inlet chamber effects axial movement of said first piston in one direction, said piston rod assembly and said second piston also moving in said one direction with said first piston, said shuttle spool being constructed and arranged so that in said second control position thereof it establishes fluid communication between said directional valve inlet chamber and said other first piston chamber on the other side of said first piston and fluid communication between said one first piston chamber on the one side of said first piston and said directional valve outlet chamber whereby flow of primary fluid from said inlet chamber effects axial movement of said first piston in a direction opposite said one direction, said piston rod assembly and said second piston also moving in said opposite direction along with said first piston, said pistion pump means including first flow control valves for controlling the flow of said secondary fluid from said supply thereof into said second piston chambers on opposite sides of said second piston and second flow control valves for controlling the flow of said secondary fluid from said second piston chambers to the upstream end of said first conduit means whereby back and forth axial movement of said piston rod assembly and said second piston being operable to draw predetermined quantities of secondary fluid into said second piston chamber and discharge the same therefrom to said first conduit means for delivering the secondary fluid to be proportioned with said primary fluid in said proportioner outlet chamber, said second piston being constructed and arranged to develop a secondary fluid delivery pressure slightly exceeding that of the primary fluid main pressure.

2. Apparatus according to claim 1 wherein said biasing means for said valving means includes a weight of a predetermined magnitude carried by said valving means to provide a substantially constant force biasing said valving means into said flow blocking position.

3. Apparatus according to claim 1 wherein said means carried by said valving means and disposed within said second port comprises a plug having a tapered peripheral surface about said axis thereof, said secondary port having a shape corresponding to said surface for cooperating therewith to define an annular flow passage having a variable area dependent on the spacing of said valving means from said seat with the area increasing as the spacing increases between the valving means and said seat.

4. Apparatus according to claim 1 wherein said directional valve housing has a main bore and said directional valve inlet chamber includes an inlet manifold in said valve housing and said outlet chamber includes a discharge manifold in said valve housing, and including a pair of axially spaced annular grooves in the main bore of said valve housing, some of said annular grooves defining inlet passages communicating with said inlet manifold, others of said annular grooves defining discharge passages communicating with said discharge manifold, still others of said annular grooves defining transfer passages, said shuttle spool having a pair of side-by-side flow control channels spanning selected ones of said inlet, discharge and transfer passages when said shuttle spool is in said first and second flow control positions.

5. Apparatus according to claim 4 including a first axial bore in said valve housing communicating at one end with one of said transfer passages and at its opposite end with one of said first piston chambers.

6. Apparatus according to claim 5 including a second axial extending bore in said valve housing communicating at one end with the other of said transfer passages and at the opposite end with the other of said first piston chamber.

7. Apparatus according to claim 1 including a third conduit means having its upstream end in flow communication with said outlet of said proportioner and its downstream end in flow communication with a discharge means for delivering the admixed primary and second fluid to a desired location, a fourth conduit means connected in flow communication at its upstream end to said outlet of said directional valve and at its downstream end to atmosphere, control valve means connected in said fourth conduit means for controlling flow therethrough and acuatable between an open and a closed position, and means responsive the pressure condition in said third conduit means for actuating said control valve means to its open position in response to the pressure condition of flow through said third conduit means to allow said primary fluid to flow through said fourth conduit means to atmosphere.

8. Apparatus according to claim 1 wherein said second conduit means is connected at its upstream end in flow communication with the inlet chamber of said proportioner and is connected at its downstream end in flow communication with the inlet chamber of said directional valve.

9. Apparatus for admixing a secondary fluid, such as a foam-liquid solution, with a primary fluid, such as water, in a predetermined proportion comprising:

a proportioner including a body having an inlet and an inlet chamber in fluid communication with said inlet, said body having an outlet and an outlet chamber in fluid communication with said outlet;

valve seat means defining a primary port providing fluid flow communication between said inlet chamber and said outlet chamber;

valving means extending across said primary port and mounted for movement between a closed position blocking fluid communication through said primary port between said inlet and outlet chambers and a variably open position spaced from said primary port providing fluid flow communication through said primary port so that the primary fluid may flow through said body from said inlet to said outlet;

means biasing said valving means in the direction of said primary port into said flow blocking position;

first conduit means providing a fluid flow conduit in said body for containing the secondary fluid to be proportioned with said primary fluid in said outlet chamber;

means associated with said first conduit means and providing a secondary port opening into said outlet chamber interiorly of said primary port;

means supplying said primary fluid at a main pressure to said inlet to said proportioner;

a supply of secondary fluid; and means delivering said secondary fluid from said supply thereof to said first conduit means at a pressure approximating said main pressure including a directional valve means including a main valve housing having an inlet and an inlet chamber in fluid communication with said inlet, and an outlet and an outlet chamber in fluid communication with said outlet, and second conduit means delivering said primary fluid to said inlet of said main valve housing from said supply thereof, a water motor means including a housing mounted at one end of said main valve housing defining an operating chamber, and an operating member dividing said operating chamber into a pair of chambers, a pump means mounted at an opposite end of said main valve housing and including a pumping member, and an actuating rod assembly mounted for axial sliding movement in said main valve housing and having said water motor operating member mounted at one end thereof and said pumping member operatively connected to the other end thereof, said actuating rod assembly being supported for reciprocating movement, said directional valve including a shuttle spool in the main valve housing adapted for axial sliding movement relative to said actuating rod assembly between a first control position and a second control position, said shuttle spool being constructed and arranged so that in said first control position thereof it establishes fluid communication between said directional valve inlet chamber and one of said operating chambers on one side of said operating member and fluid communication between the other of said operating chambers on the other side of said operating member and said directional valve outlet chamber whereby flow of primary fluid from said directional valve inlet chamber effects axial movement of said operating member in one direction, said actuating rod assembly and said pumping member also moving in said one direction with said operating member, said shuttle spool being constructed and arranged so that in said second control position thereof it establishes fluid communication between said directional valve inlet chamber and said other operating chamber on the other side of said operating member and fluid communication between said one operating chamber on the one side of said operating member and said directional valve outlet chamber whereby flow of primary fluid from said inlet chamber effects axial movement of said operating member in a direction opposite said one direction, said actuating rod assembly and said pumping member also moving in said opposite direction along with said operating member, said pump means including an inlet in flow communication with said secondary fluid supply an outlet in flow communication with the upstream end of said first conduit means, said pump means being operable to draw predetermined quantities of secondary fluid from said supply thereof and discharge the same therefrom to said first conduit means for delivering the secondary fluid to be proportioned with said primary fluid in said proportioner outlet chamber, said pump means being constructed and arranged to develop a secondary fluid delivery pressure slightly exceeding that of the primary fluid main pressure.

10. Apparatus according to claim 9 wherein said biasing means for said valving means includes a weight of a predetermined magnitude carried by said valving means to provide a substantially constant force biasing said valving means into said flow blocking position.

11. Apparatus according to claim 9 wherein said directional valve housing has a main bore and said directional valve inlet chamber includes an inlet manifold in said valve housing and said outlet chamber includes a discharge manifold in said valve housing, and including a pair of axially spaced annular grooves in the main bore of said valve housing, some of said annular grooves defining inlet passages communicating with said inlet manifold, others of said annular grooves defining discharge passages communicating with said discharge manifold, still others of said annular grooves defining transfer passages, said shuttle spool having a pair of side-by-side flow control channels spanning selected ones of said inlet, discharge and transfer passages when said shuttle spool is in said first and second flow control positions.

12. Apparatus according to claim 11 including a first axial bore in said valve housing communicating at one end with one of said transfer passages and at its opposite end with one of said operating chambers.

13. Apparatus according to claim 12 including a second axial extending bore in said valve housing communicating at one end with the other of said transfer passages and at the opposite end with the other of said operating chambers.

14. Apparatus according to claim 9 including a third conduit means having its upstream end in flow communication with said outlet of said proportioner and its downstream end in flow communication with a discharge means for delivering the admixed primary and second fluid to a desired location, a fourth conduit means connected in flow communication at its upstream end to said outlet of said directional valve and at its downstream end to atmosphere, control valve means connected in said fourth conduit means for controlling flow therethrough and accuatable between an open and a closed position, and means responsive to the pressure condition in said third conduit means for actuating said control valve means to its open position in response to the pressure condition of flow through said third conduit means to allow said primary fluid to flow through said fourth conduit means to atmosphere.

15. Apparatus according to claim 9 wherein said second conduit means is connected at its upstream end in flow communication with the inlet chamber of said proportioner and is connected at its downstream end in flow communication with the inlet chamber of said directional valve.

16. Apparatus for admixing a secondary fluid, such as a foam-liquid solution, with a primary fluid, such as water, in a predetermined proportion comprising:

- a proportioner including
- a body having an inlet and an inlet chamber in fluid communication with said inlet, said body having an outlet and an outlet chamber in fluid communication with said outlet;
- valve seat means defining a primary port providing fluid flow communication between said inlet chamber and said outlet chamber;
- valving means extending across said primary port and mounted for movement between a closed position blocking fluid communication through said primary port between said inlet and outlet chambers and a variably open position spaced from said primary port providing fluid flow communication through said primary port so that the primary fluid may flow through said body from said inlet to said outlet;
- means biasing said valving means in the direction of said primary port into said flow blocking position;
- first conduit means providing a fluid flow conduit in said body for containing the secondary fluid to be proportioned with said primary fluid in said outlet chamber;
- means associated with said first conduit means and providing a secondary port opening into said outlet chamber interiorly of said primary port;
- means supplying said primary fluid at a main pressure to said inlet to said proportioner;
- a supply of secondary fluid, and
- means delivering said secondary fluid from said supply thereof to said first conduit means at a pressure slightly exceeding said main pressure including
- a water motor means including a housing defining a water motor chamber and an operating member movably mounted in said water motor chamber,
- a pump means including a housing defining a pumping chamber and a pumping member movably mounted in said pumping chamber,
- a motion transmitting means operatively connected between said water motor operating member and said pumping member,
- said water motor means including inlet means for delivering liquid flow to said operating chamber for driving said operating member and outlet means for discharging liquid flow from said operating chamber,
- second conduit means delivering a flow of said primary fluid to said inlet means of said water motor,
- said pump means including an inlet to said pumping chamber in flow communication with said secondary fluid supply, and an outlet from said pumping chamber in flow communication with the upstream end of said first conduit means, said pump means being operable to draw a predetermined quantity of said secondary fluid from said supply thereof and discharge the same therefrom to said first conduit means for delivering the secondary fluid to be proportioned with said primary fluid in said proportioner outlet chamber,
- said pump means being constructed and arranged to develop a secondary fluid delivery pressure slightly exceeding that of the primary fluid main pressure.

17. Apparatus according to claim 16 including a third conduit means having its upstream end in flow communication with said outlet of said proportioner and its downstream end in flow communication with a discharge means for delivering the admixed primary and secondary fluid to a desired location, a fourth conduit means connected in flow communication at its upstream end to said outlet means of said water motor means and connected at its downstream end to atmosphere, control valve means connected in said fourth conduit means for controlling flow therethrough and actuatable between an open and a closed position, and means responsive to the pressure condition in said third conduit means for actuating said control valve means to its open position in response to the pressure condition of flow through said third conduit means to allow said primary fluid to flow through said fourth conduit means to atmosphere.

18. Apparatus according to claim 16 wherein said second conduit means is connected at its upstream end in flow communication with the inlet chamber of said proportioner and is connected at its downstream end in flow communication with said inlet means of said water motor means.

* * * * *